US012549792B2

(12) United States Patent
Karazoun

(10) Patent No.: US 12,549,792 B2
(45) Date of Patent: *Feb. 10, 2026

(54) METHODS AND APPARATUS TO IDENTIFY MEDIA FOR AHEAD OF TIME WATERMARK ENCODING

(71) Applicant: The Nielsen Company (US), LLC, New York, NY (US)

(72) Inventor: Khaldun Karazoun, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,734

(22) Filed: Jun. 20, 2024

(65) Prior Publication Data
US 2024/0422374 A1     Dec. 19, 2024

Related U.S. Application Data

(63) Continuation of application No. 17/877,431, filed on Jul. 29, 2022, now Pat. No. 12,041,283, which is a continuation of application No. 16/862,539, filed on Apr. 29, 2020, now Pat. No. 11,405,674.

(60) Provisional application No. 62/934,334, filed on Nov. 12, 2019.

(51) Int. Cl.
H04N 21/262     (2011.01)
H04N 21/8358    (2011.01)

(52) U.S. Cl.
CPC ... H04N 21/26241 (2013.01); H04N 21/2625 (2013.01); H04N 21/8358 (2013.01)

(58) Field of Classification Search
CPC ......... G06T 5/70; G06T 5/10; G06T 2207/10; G06V 10/751; H04N 21/26241; H04N 21/2625; H04N 21/83; H04N 21/58
See application file for complete search history.

(56) References Cited

U.S. PATENT DOCUMENTS

2010/0205628 A1     8/2010   Davis et al.

*Primary Examiner* — Yassin Alata

(57) ABSTRACT

Methods, apparatus, systems, and articles of manufacture are disclosed to identify media for ahead of time watermark encoding. An example apparatus includes a media interface to determine a characteristic of media, the characteristic corresponding to a broadcast time of the media; and a controller to: determine an identifier corresponding to the media; transmit a query including the characteristic and the identifier prior to the media being broadcast, the query to request an indication whether the identifier is unique; and responsive to the indication that the identifier is unique, cause a watermark to be encoded in the media using the identifier prior to the media being broadcast.

20 Claims, 9 Drawing Sheets

FIG. 7

| | C1 SID | C2 Scheduled Broadcast Time | C3 Last Date/Time After Encode | C4 Encoding Information |
|---|---|---|---|---|
| R1 | 001 | 09/01/2019 06:00:00 | 09/01/2019 07:00:00 | 1st program, 60 min duration |
| R2 | 002 | 09/01/2019 06:00:00 | 09/01/2019 07:30:00 | 2nd program, 90 min duration same start time as 1st program with a different SID |
| R3 | 003 | 09/01/2019 06:00:00 | 09/01/2019 08:00:00 | 3rd program, 120 min duration with same start time as 1st and 2nd with a different SID |
| R4 | 001 | 09/01/2019 06:00:00 | Not Encoded with SID 001 | 4th program, 60 min duration. 4th program is not encoded because it has the same SID and overlaps with the 1st program. SRS 106 transmits to workflow manager 104 that SID is not available |
| R5 | 001 | 09/01/2019 07:00:00 | 09/01/2019 08:00:00 | 4th program, 60 min duration |
| R6 | 002 | 09/01/2019 07:00:00 | Not Encoded with SID 002 | 5th program, 30 min duration. 5th program is not encoded because it has the same SID and overlaps with the 2nd program. SRS 106 transmits to workflow manager 104 that SID is not available |
| R7 | 003 | 09/01/2019 07:00:00 | Not Encoded with SID 003 | 5th program, 30 min duration. 5th program is not encoded because it has the same SID and overlaps with the 2nd program. SRS 106 transmits to workflow manager 104 that SID is not available |
| R8 | 004 | 09/01/2019 07:00:00 | 09/01/2019 07:30:00 | 5th program, 30 min duration |

| | C1 | C2 | C3 | C4 |
|---|---|---|---|---|
| | SID | Scheduled Broadcast Time | Last Date/Time After Encode | Encoding Information |
| R1 | 001 | 09/01/2019 00:00:00 | 09/01/2019 01:00:00 | 1st program, 60 min duration |
| R2 | 001 | 09/01/2019 01:15:00 | 09/01/2019 02:15:00 | 2nd program, 60 min duration |
| R3 | 001 | 09/01/2019 02:30:00 | 09/01/2019 03:30:00 | 3rd program, 60 min duration |
| R4 | 002 | 09/01/2019 00:00:00 | 09/01/2019 01:00:00 | 4th program, 60 min duration |
| R5 | 002 | 09/01/2019 01:15:00 | 09/01/2019 01:45:00 | 5th program, 30 min duration |
| R6 | 002 | 09/01/2019 02:00:00 | 09/01/2019 02:30:00 | 6th program, 30 min duration |
| R7 | 003 | 09/01/2019 00:00:00 | 09/01/2019 00:30:00 | 7th program, 30 min duration |

FIG. 8

METHODS AND APPARATUS TO IDENTIFY MEDIA FOR AHEAD OF TIME WATERMARK ENCODING

CROSS REFERENCE TO RELATED APPLICATIONS

This disclosure is a continuation of U.S. patent application Ser. No. 17/877,431, filed on Jul. 29, 2022, now issued as U.S. Pat. No. 12,041,283, which is a continuation of U.S. patent application Ser. No. 16/862,539, filed on Apr. 29, 2020, now issued as U.S. Pat. No. 11,405,674, which claims the benefit of U.S. Provisional Patent Application No. 62/934,334, filed on Nov. 12, 2019, each of which is hereby incorporated by reference in its entirety.

FIELD OF THE DISCLOSURE

This disclosure relates generally to watermarking, and, more particularly, to methods and apparatus to identify media for ahead of time watermark encoding.

BACKGROUND

Media providers and/or other entities (e.g., advertising companies, broadcast networks, etc.) are often interested in the viewing, listening, and/or media behavior of audience members and/or the public in general. The media usage and/or exposure habits of monitored audience members, as well as demographic data about the audience members, are collected and used to statistically determine the size and demographics of an audience of interest. Media providers and/or other entities often embed codes and/or watermarks into media for identification purposes. Watermarking is a technique used to identify media such as television broadcasts, radio broadcasts, advertisements (television and/or radio), downloaded media, streaming media, prepackaged media, etc. Existing watermarking techniques identify media by embedding audio codes (e.g., watermarks), such as media identifying information and/or an identifier that may be mapped to media identifying information, into an audio and/or video component.

BRIEF DESCRIPTION OF THE DRAWINGS

FIG. 7 is a table representative of example operations executed at the SID reservation system of FIGS. 1 and 3.

FIG. 8 is a table representative of example additional operations executed at the SID reservation system of FIGS. 1 and 3.

Figure 1:
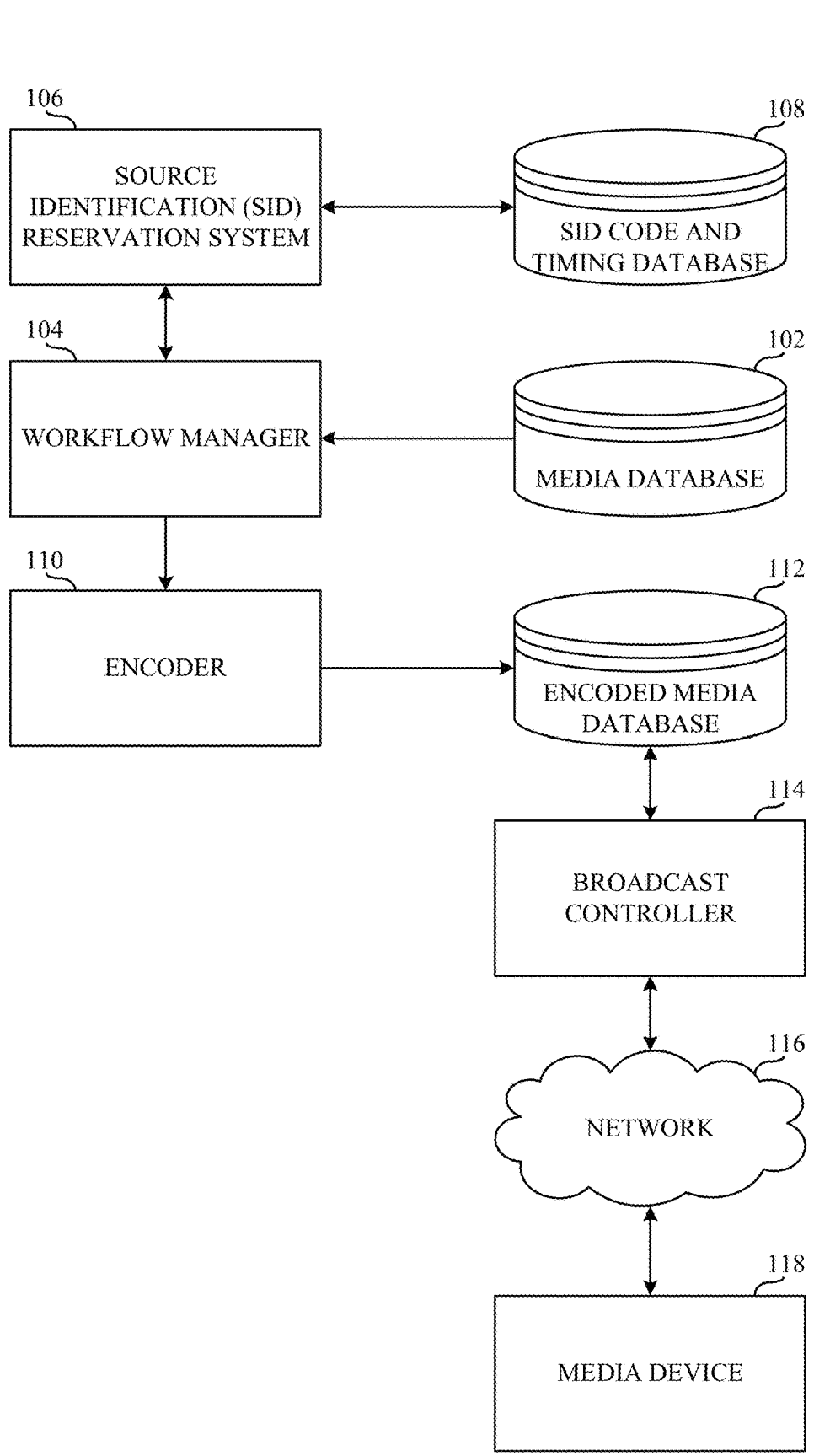
FIG. 1 is a block diagram of an example system to identify media for pre-broadcast watermark encoding.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Media providers and/or other entities (e.g., advertising companies, broadcast networks, etc.) are often interested in the viewing, listening, and/or media behavior of audience members and/or the public in general. The media usage and/or exposure habits of monitored audience members, as well as demographic data about the audience members, are collected and used to statistically determine the size and demographics of an audience of interest. Media providers and/or other entities often embed codes and/or watermarks into media for identification purposes. Watermarking is a technique used to identify media such as television broadcasts, radio broadcasts, advertisements (television and/or radio), downloaded media, streaming media, prepackaged media, etc. Existing watermarking techniques identify media by embedding audio codes (e.g., watermarks), such as media identifying information and/or an identifier that may be mapped to media identifying information, into an audio and/or video component.

Some media providers and/or other entities provide video on demand (VOD). Additionally, media providers and/or other entities provide recently telecast video on demand (RTVOD). Media providers and/or other entities utilize hardware and/or software encoders to encode watermarks and/or codes into RTVOD and/or other types of recently broadcast media. Encoding techniques for RTVOD and/or other types of recently broadcast media rely on the timestamp (e.g., date and time) at which the media was broadcast and are thus, delayed until the media has been timestamped at broadcast time. Encoding with these techniques can take several hours and some media providers and/or other entities prefer to encode watermarks in a shorter time span.

Alternatively, watermarks and/or codes can be encoded into video and/or other types of media that are selected to be provided as RTVOD and/or recently broadcast media on demand more quickly than prior encoding techniques by encoding the watermarks into the media ahead of the broadcast time. This alternate, pre-broadcast (e.g., ahead of time) technique, can be accomplished by encoding watermarks and/or codes into a copy of the video and/or other media that is selected to be provided as RTVOD and/or recently broadcast media on demand. However, because encoding techniques for video and/or other media that is selected to be provided as RTVOD and/or other recently broadcast media on demand rely on the timestamps at which the media was broadcast or will be broadcast at, applying the correct timestamp to video and/or other media that is selected to be provided as RTVOD and/or other recently broadcast media on demand can be problematic with overlapping and/or incorrect timestamps applied to watermarked media. For example, some techniques to watermark video and/or other media that is selected to be provided as RTVOD and/or other recently broadcast media on demand utilize the system clock time to timestamp (e.g., date and time) media. In such an example, the system clock does not provide the correct timestamp for media that is watermarked prior to broadcast time because the system clock time reflects the time at which the media was watermarked, not the time at which the media is to be broadcast. Additionally, pre-broadcast watermarking techniques can watermark media more quickly than the actual runtime of the media (e.g., a 60-minute program can be watermarked prior to broadcast time in 10 minutes). Thus, multiple media assets encoded in series can result in applying incorrect time stamps the media.

Additionally, some media providers and/or other entities may provide multiple media programs on a variety of channels (e.g., television channels, radio stations, etc.) at the same time (e.g., syndicated media). Thus, unique identifiers for watermarked media when utilizing encoding techniques that rely on the timestamps at which the media was broadcast or the timestamp at which the media will be broadcast are not achievable at utilizing prior encoding techniques.

Examples disclosed herein provide methods, apparatus, and articles of manufacture to uniquely identify media for ahead of time watermark encoding. Examples disclosed herein include an apparatus comprising a processor to determine a first identifier associated with first media based on a query received from a workflow manager, the query including the first identifier, a first scheduled broadcast time of the first media, and a first duration of the first media; a comparator to: in response to determining a database includes a second identifier associated with second media, determine whether a second duration of the second media at a second scheduled broadcast time overlaps the first duration of the first media at the first scheduled broadcast time; and in response to determining that the second duration of the second media at the second scheduled broadcast time does not overlap the first duration of the first media at the first scheduled broadcast time, store the first identifier in the database.

FIG. 1 is a block diagram of an example system 100 to identify media for pre-broadcast (e.g., ahead of time) watermark encoding. The example system 100 includes an example media database 102, an example workflow manager 104, an example source identification (SID) reservation system (SRS) 106, an example SID code and timing database 108, an example encoder 110, an example encoded media database 112, and example broadcast controller 114, an example network 116, and an example media device 118. In the example of FIG. 1, the system 100 can be distributed between one or more geographical locations. In the example of FIG. 1, the media database 102, the workflow manager 104, the SRS 106, the SID code and timing database 108, the encoder 110, the encoded media database 112, and the broadcast controller 114 are implemented at a first geographical location (e.g., a media provider, a broadcast network, etc.) while media device 118 is implemented at second geographical location (e.g., a home, a workplace, a recreational center, a panelist home, etc.).

In the example of FIG. 1, the media database 102 stores media to be watermarked ahead of time (e.g., television programming or advertisements, radio programming or advertisements, movies, web sites, streaming media, etc.). Media stored in the media database 102 may be formatted to include indications of the scheduled broadcast times on media, durations of media, a title (e.g., label) of media. The duration of media can be formatted in seconds. The media database 102 is coupled to the workflow manager 104. The media database 102 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The media database 102 can additionally or alternatively be implemented by one or more double data rate (DDR) memories, such as DDR, DDR2, DDR3, mobile DDR (mDDR), etc. The media database 102 can additionally or alternatively be implemented by one or more mass storage devices such as hard disk drive(s), compact disk drive(s) digital versatile disk drive(s), etc. While, in the illustrated example, the media database 102 is illustrated as a single database, the media database 102 can be implemented by any number and/or type(s) of databases. Furthermore, the data stored in the media database 102 can be in any data format such as, for example, binary data, comma delimited data, tab delimited data, structured query language (SQL) structures, etc.

In the illustrated example of FIG. 1, the workflow manager 104 processes media to be watermarked ahead of time and communicates with the SRS 106 and the encoder 110 to facilitate ahead of time watermarked media that is uniquely identifiable. The example workflow manager 104 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In some examples, the workflow manager 104 can be implemented by a workflow manager controller.

In the example illustrated in FIG. 1, the workflow manager 104 is coupled to the media database 102, the SRS 106, and the encoder 110. The workflow manager 104 is configured to obtain one or more media assets (e.g., media) to be watermarked from the media database 102. The workflow manager 104 is additionally configured to determine an encoding level to encode watermarks into media, a check digit associated with the encoding of media, a title for the media to be watermarked (e.g., a label of the media), a scheduled broadcast time of the media, and a duration of the media. The workflow manager 104 is further configured to select a candidate SID code for media to be watermarked and to query the SRS 106 with the scheduled broadcast time, the candidate SID code, the media title, and the duration of the media.

In the illustrated example of FIG. 1, in response to the SRS 106 indicating the candidate SID code is not available, the workflow manager 104 is configured to select a new candidate SID code for the media and to query the SRS 106 with the new candidate SID code. In response to the SRS 106 indicating the candidate SID code is available, the workflow manager 104 is configured to dispatch the SID code, the check digit, the scheduled broadcast time, the encoding level to the encoder 110 to encode a watermark into the media ahead of time, and the media to be watermarked ahead of time.

In the example of FIG. 1, the SRS 106 is a system that determines whether a candidate SID code for media associated with a query from the workflow manager 104 is a unique SID code for a scheduled broadcast time and duration included in the query. The SRS 106 is coupled to the workflow manager 104 and the SID code and timing database 108. The example SRS 106 can be implemented by one or more analog or digital circuit(s), logic circuits, programmable processor(s), programmable controller(s), GPU(s), DSP(s), ASIC(s), PLD(s) and/or FPLD(s). In some examples, the SRS 106 can be implemented by a SID reservation system controller.

In the illustrated example of FIG. 1, the SRS 106 is configured to obtain queries from the workflow manager 104. Queries can include a scheduled broadcast time for media, a candidate SID code for the media, a title for the media (e.g., a media label), and a duration of the media. The duration of media can be formatted in seconds. In some examples, additional characteristics of the media may be included in a query. The SRS 106 is configured to, based on a query, determine a candidate SID code for the media, determine a scheduled broadcast time of the media, determine a title of the media (e.g., a label for the media), and a duration of the media. The SRS 106 is additionally configured to compare the candidate SID code to the SID code and timing database 108.

In the example of FIG. 1, in response to determining that the SID code and timing database 108 does not include the candidate SID code, the SRS 106 is configured to associate the SID code with the title of the media, the scheduled broadcast time of the media, and the duration of the media associated with the query. In response to determining that the SID code and timing database 108 includes the candidate SID code, the SRS 106 is configured to determine whether media associated with the matching SID code stored in the SID code and timing database 108 overlaps the media associated with the candidate SID code. More specifically, the SRS 106 is configured to determine whether the duration and the scheduled broadcast time of media associated with the matching SID code stored in the SID code and timing database 108 overlaps the duration and the scheduled broadcast time of the media associated with the candidate SID code of the query from the workflow manager 104.

In the example illustrated in FIG. 1, in response to determining the media associated with the matching SID code stored in the SID code and timing database 108 overlaps the media associated with the candidate SID code, the SRS 106 is configured to transmit a message to the workflow manager 104 indicating the candidate SID code is unavailable. In response to determining the media associated with the matching SID code stored in the SID code and timing database 108 does not overlap the media associated with the candidate SID code, the SRS 106 is configured to associate the SID code with the title of the media, the scheduled broadcast time of the media, and the duration of the media associated with the query.

In the illustrated example of FIG. 1, after associating the SID code with the title of the media, the scheduled broadcast time of the media, and the duration of the media associated with the query, the SRS 106 is configured to store the associated title of the media, the associated scheduled broadcast time, and the associated duration of the media in the SID code and timing database 108. The SRS 106 is further configured to transmit to the workflow manager 104 a message including the SID code and the scheduled broadcast time.

In the example of FIG. 1, the SID code and timing database 108 stores SID codes, scheduled broadcast times, durations, media titles (e.g., labels). In additional or alternative examples, the SID code and timing database 108 can store a timestamp associated with end of the duration of the media (e.g., the scheduled broadcast time plus the duration of the media). In some examples, the SID code and timing database 108 can be implemented as a search engine. For example, if SID codes, scheduled broadcast times, media titles, and/or media durations are stored for an extended period of time (e.g., weeks to months), the SID code and timing database 108 can be implemented using search engine based techniques. In other examples, the SID code and timing database 108 can be implemented as a data structure. For example, if SID codes, schedules broadcast times, media titles, and/or media durations are stored for a shortened period of time (e.g., days to a week), the SID code and timing database 108 can be implemented by a look up table (LUT). In such an example, the LUT implementation of the SID code and timing database 108 can include rows corresponding to SID code entries and columns corresponding to SID code values, scheduled broadcast times, timestamps associated with the end of the durations of media, titles (e.g., labels) of media, and durations of media. The duration of media can be formatted in seconds.

In the example illustrated in FIG. 1, the SID code and timing database 108 is coupled to the SRS 106. The SID code and timing database 108 can be implemented by a volatile memory (e.g., a SDRAM, DRAM, RDRAM, etc.) and/or a non-volatile memory (e.g., flash memory, etc.). The SID code and timing database 108 can additionally or alternatively be implemented by one or more DDR memories, such as DDR, DDR2, DDR3, mDDR, etc. The SID code and timing database 108 can additionally or alternatively be implemented by one or more mass storage devices such as hard disk drive(s), compact disk drive(s) digital versatile disk drive(s), etc. While, in the illustrated example, the SID code and timing database 108 is illustrated as a single database, the SID code and timing database 108 can be implemented by any number and/or type(s) of databases. Furthermore, the data stored in the SID code and timing database 108 can be in any data format such as, for example, binary data, comma delimited data, tab delimited data, SQL structures, etc.

In the example of FIG. 1, the encoder 110 is coupled to the workflow manager 104 and the encoded media database 112. The encoder 110 encodes watermarks into media received from the workflow manager 104. For example, the encoder 110 encodes watermarks and/or codes into media generated by media producers. The encoder 110 encodes watermarks and/or codes into media based on the unique SID determined by the workflow manager 104 and the SRS 106, the check digit generated by the workflow manager 104, the scheduled broadcast time of media, and the encoding level to encode watermarks and/or codes into media. Additionally, the encoder 110 transmits the encoded media to the encoded media database 112. In some examples, the encoder 110 can be implemented by a dedicated hardware encoder while in other examples, the encoder 110 can be implemented as software executing on one or more processors and/or one or more computational elements. The example encoder 110 can be implemented by one or more analog or digital circuit(s), logic circuits, programmable processor(s), programmable controller(s), GPU(s), DSP(s), ASIC(s), PLD(s) and/or FPLD(s). In some examples, the encoder 110 can encode multiple media assets in parallel utilizing multiple instances of the encoder 110. In additional or alternative examples, the encoder 110 can encode multiple media assets in series. In further examples, the encoder 110 can encode multiple media assets in series and/or in parallel.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information. Example systems for identifying media based on codes are long known and were first disclosed in Thomas, U.S. Pat. No. 5,481,294, which is hereby incorporated by reference in its entirety.

In the example of FIG. 1, the encoded media database 112 stores ahead of time watermarked media (e.g., television programming or advertisements, radio programming or advertisements, movies, web sites, streaming media, etc.). The encoded media database 112 is coupled to the encoder 110 and the broadcast controller 114. The encoded media database 112 can be implemented by a volatile memory (e.g., a SDRAM, DRAM, RDRAM, etc.) and/or a non-volatile memory (e.g., flash memory, etc.). The encoded media database 112 can additionally or alternatively be implemented by one or more DDR memories, such as DDR, DDR2, DDR3, mDDR, etc. The encoded media database 112 can additionally or alternatively be implemented by one or more mass storage devices such as hard disk drive(s), compact disk drive(s) digital versatile disk drive(s), etc. While, in the illustrated example, the encoded media database 112 is illustrated as a single database, the encoded media database 112 can be implemented by any number and/or type(s) of databases. Furthermore, the data stored in the encoded media database 112 can be in any data format such as, for example, binary data, comma delimited data, tab delimited data, SQL structures, etc.

In the example of FIG. 1, the broadcast controller 114 is coupled to the encoded media database 112 and the network 116. The broadcast controller 114 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. The broadcast controller 114 can monitor the media device 118 via the network 116 to determine whether the media device 118 has requested recently broadcast media on demand (e.g., RTVOD). In response to a request for recently broadcast media on demand, the broadcast controller 114 can transmit a copy of the requested media to the media device 118 and/or stream the requested media to the media device 118 by accessing the encoded media database 112. Advertising, such as an advertisement and/or a preview of other programming that is or will be offered by the broadcast controller 114, etc., is also typically included in the media. In some examples, the broadcast controller 114 can provide syndicated media to the media device 118.

In some examples, the broadcast controller 114 can be implemented by a streaming service to stream RTVOD. For example, the broadcast controller 114 can be implemented as a service such as Disney+™. When implementing examples disclosed herein, media broadcast on television channels and/or other channels of media that are programmed by Disney™ can be encoded with watermarks prior to the broadcast time of that media. Accordingly, the broadcast controller 114 can make available to the media device 118 (e.g., via Disney+™), at the broadcast time of the media, media that has been watermarked prior to broadcast time.

In the illustrated example of FIG. 1, the example network 116 is coupled to the broadcast controller 114 and the media device 118. In the example of FIG. 1, the network 116 is the Internet. However, the example network 116 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 116 enables the example media device 118 to be in communication with the broadcast controller 114. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the example media device 118 is coupled to the network 116. The media device 118 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. However, the example media device 118 can correspond to any type of audio, video and/or multimedia device capable of presenting media audibly and/or visually. In some examples, the media device 118 (e.g., a television) may communicate audio to another media device (e.g., an audio/video receiver) for output by one or more speakers (e.g., surround sound speakers, a sound bar, etc.). As another example, the media device 118 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience. In some examples, the media device 118 can request RTVOD and/or other recently broadcast media on demand.

While FIG. 1 illustrates the system 100 implemented in two geographical locations (e.g., a media provider, a broadcast network, etc. and a viewing location), the system 100 can be implemented in a distributed environment where the media database 102, the workflow manager 104, the encoder 110, the encoded media database 112, and the broadcast controller 114 are implemented at a first geographical location (e.g., a media provider, a broadcast network, etc.) and the SRS 106 and the SID code and timing database 108 are implemented at a second geographical location (e.g., a media monitoring entity, a datacenter, etc.) while the media device 118 is implemented at a third geographical location (e.g., a viewing location, a household, a living space, etc.). In other examples, the system 100 can be implemented in any geographic configuration. For example, each of the media database 102, the workflow manager 104, the SRS 106, the SID code and timing database 108, the encoder 110, and the encoded media database 112 can be implemented at separate geographic locations (e.g., in the cloud). In such an example, the SRS 106 and the SID code and timing database 108 can be implemented as a service provided by a cloud provider such as Amazon Web Services®, Microsoft Azure®, VMware®, Google Cloud Platform™, IBM Cloud™, and/or any other suitable cloud provider.

Figure 2:
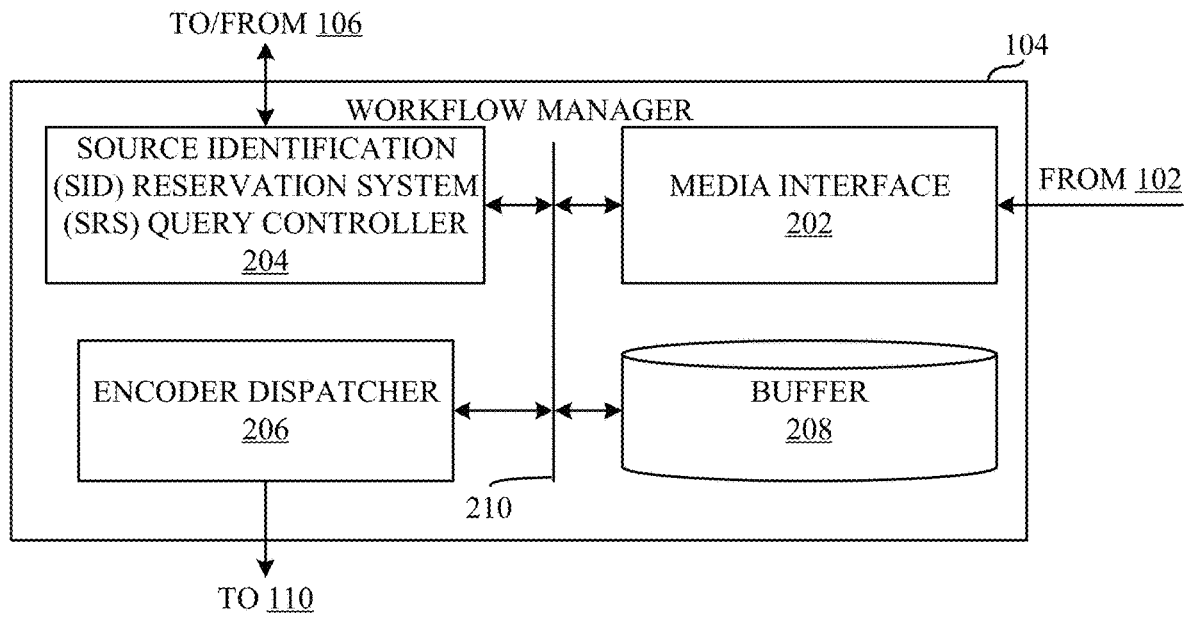
FIG. 2 is a block diagram showing additional detail of the example workflow manager of FIG. 1

FIG. 2 is a block diagram showing additional detail of the example workflow manager 104 of FIG. 1. The example workflow manager 104 includes an example media interface 202, an example source identification (SID) reservation system (SRS) query controller 204, an example encoder dispatcher 206, and an example buffer 208. In the example of FIG. 2, any of the media interface 202, the SRS query controller 204, the encoder dispatcher 206, and/or the buffer 208 can communicate via an example communication bus 210. In examples disclosed herein, the communication bus 210 may be implemented using any suitable wired and/or wireless communication method.

In the illustrated example of FIG. 2, the workflow manager 104 processes media to be watermarked ahead of time and communicates with the SRS 106 and the encoder 110 to facilitate ahead of time watermarked media that is uniquely identifiable. The media interface 202 is coupled to the media database 102 and the communication bus 210. In the example of FIG. 2, the example media interface 202 can be implemented by one or more analog or digital circuit(s), logic circuits, programmable processor(s), programmable controller(s), GPU(s), DSP(s), ASIC(s), PLD(s) and/or FPLD(s). In some examples, the media interface 202 can be implemented by a media interface controller.

The media interface 202 is configured to process media from the media database 102 to extract at least a scheduled broadcast time for media, a title (e.g., a label) for the media, and a duration of the media. The duration of media can be represented in seconds. In other examples, the duration of media can be represented in other time bases. The media interface 202 is configured to obtain one or more media assets (e.g., media) to be watermarked from the media database 102. In some examples, the media interface 202 can obtain media from the media database 102 as the media becomes available. In other examples, the media interface 202 can obtain media from the media database 102 at a predetermined frequency. For example, if a media provider records media at a predetermined time and date (e.g., every Monday at 5 PM), the media interface 202 can be configured to obtain media from the media database 102 after the predetermined time and date.

In the example of FIG. 2, the media interface 202 is additionally configured to determine an encoding level to encode watermarks into media. For example, for a first media asset (e.g., a television program), the encoder 110 can encode watermarks at a first encoding level while for a second media asset (e.g., a radio program), the encoder 110 can encode watermarks at a second encoding level. In some examples, the encoding level can be pre-loaded to the media interface 202. In other examples, the media interface 202 can determine the encoding level to encode watermarks into media based on the type of media and/or other characteristics of the media (e.g., title of the media, duration of the media, scheduled broadcast time of the media, etc.).

In the illustrated example of FIG. 2, the media interface 202 is configured to determine a check digit to be utilized when watermarking the media ahead of time. For example, the media interface 202 can implement any suitable technique to determine the check digit to be utilized when watermarking the media ahead of time. For example, the media interface 202 can determine the check digit via the Luhn algorithm, the Verhoeff algorithm, or the Damm algorithm. Other algorithms to determine the check digit.

In the example of FIG. 2, the media interface 202 is further configured to determine the title (e.g., the label) of media obtained from the media database 102, a scheduled broadcast time for media obtained from the media database 102, and a duration of media obtained from the media database 102. For example, the media interface 202 can parse the media and/or metadata associated with the media to determine the title (e.g., the label) of media, the scheduled broadcast time of media, and/or the duration of media. In some examples, the media interface 202 transmits processed data to the SRS query controller 204 and/or the encoder dispatcher 206. In additional or alternative examples, the media interface 202 can temporarily store processed data in the buffer 208 that is accessible by the SRS query controller 204 and/or the encoder dispatcher 206.

In the example illustrated in FIG. 2, the SRS query controller 204 generates queries to transmit to the SRS 106 and/or processes responses from the SRS 106. The SRS query controller 204 is coupled to the SRS 106 and the communication bus 210. In the example of FIG. 2, the example SRS query controller 204 can be implemented by one or more analog or digital circuit(s), logic circuits, programmable processor(s), programmable controller(s), GPU(s), DSP(s), ASIC(s), PLD(s) and/or FPLD(s).

In the illustrated example of FIG. 2, the SRS query controller 204 is configured to select a candidate SID code to apply to media that is to be watermarked ahead of time. For example, the SRS query controller 204 can select a SID code from a predetermined list of SID codes provided by a media monitoring company. The SRS query controller 204 is further configured to generate one or more queries to the SRS 106 including a scheduled broadcast time for the media to be watermarked, the candidate SID code to apply to the media to be watermarked, the title (e.g., the label) of the media to be watermarked, and the duration of the media to be watermarked (e.g., in seconds).

In the example of FIG. 2, the SRS query controller 204 is configured to transmit the query to the SRS 106 (e.g., the SRS query controller 204 is configured to query the SRS 106). The SRS query controller 204 is additionally configured to monitor the SRS 106 for responses to queries. The SRS query controller 204 is configured to determine whether responses from the SRS 106 indicate that the candidate SID code is available in the SID code and timing database 108. In response to determining that a response from the SRS 106 indicates the candidate SID code is not available in the SID code and timing database 108, the SRS query controller 204 can select a new candidate SID code. In response to determining that a response from the SRS 106 indicates the candidate SID is available in the SID code and timing database 108, the SRS query controller 204 can obtain the SID code and scheduled broadcast time for the media to be watermarked ahead of time. In additional or alternative examples, in response to determining that a response from the SRS 106 indicates the candidate SID code is not available in the SID code and timing database 108, the SRS query controller 204 can wait for the next available set of SID codes for the encode 110. In further examples, in response to determining that a response from the SRS 106 indicates the candidate SID code is not available in the SID code and timing database 108, the SRS query controller 204 can be configured to return the next available SID code.

In the illustrated example of FIG. 2, the encoder dispatcher 206 dispatches media and associated information to the encoder 110 to encode watermarks into media ahead of time. The encoder dispatcher 206 is coupled to the encoder 110 and the communication bus 210. In the example of FIG. 2, the example encoder dispatcher 206 can be implemented by one or more analog or digital circuit(s), logic circuits, programmable processor(s), programmable controller(s), GPU(s), DSP(s), ASIC(s), PLD(s) and/or FPLD(s). In some examples, the encoder dispatcher 206 can be implemented by an encoder dispatcher controller.

In the example of FIG. 2, the encoder dispatcher 206 is configured to, after the SRS query controller 204 obtains the SID code and scheduled broadcast time of the media to be watermarked ahead of time, dispatch the SID code, the check digit, the scheduled broadcast time, the encoding level, and the associated media to be watermarked ahead of time to the encoder of 110. For example, the encoder dispatcher 206 can access the SID code, the check digit, the scheduled broadcast time, the encoding level, and/or the associated media to be watermarked ahead of time from the buffer 208.

In the illustrated example of FIG. 2, the buffer 208 stores media to be watermarked ahead of time (e.g., television programming or advertisements, radio programming or advertisements, movies, web sites, streaming media, etc.), encoding levels, check digits, media titles (e.g., labels), scheduled broadcast times of media, durations of media, and candidate SID codes. The buffer 208 is coupled to the communication bus 210. The buffer 208 can be implemented by a volatile memory (e.g., a SDRAM, DRAM, RDRAM, etc.) and/or a non-volatile memory (e.g., flash memory, etc.). The buffer 208 can additionally or alternatively be implemented by one or more DDR memories, such as DDR, DDR2, DDR3, mDDR, etc. The buffer 208 can additionally or alternatively be implemented by one or more mass storage devices such as hard disk drive(s), compact disk drive(s) digital versatile disk drive(s), etc. While, in the illustrated example, the buffer 208 is illustrated as a single database, the buffer 208 can be implemented by any number and/or type(s) of databases. Furthermore, the data stored in the buffer 208 can be in any data format such as, for example, binary data, comma delimited data, tab delimited data, SQL structures, etc.

While an example manner of implementing the workflow manager 104 of FIG. 1 is illustrated in FIG. 2, one or more of the elements, processes and/or devices illustrated in FIG. 2 may be combined, divided, re-arranged, omitted, eliminated and/or implemented in any other way. Further, the example media interface 202, the example source identification reservation system query controller 204, the encoder dispatcher 206, the buffer 208, and/or, more generally, the example workflow manager 104 of FIG. 2 may be implemented by hardware, software, firmware and/or any combination of hardware, software and/or firmware. Thus, for example, any of the example media interface 202, the example source identification reservation system query controller 204, the encoder dispatcher 206, the buffer 208, and/or, more generally, the example workflow manager 104 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of t the example media interface 202, the example source identification reservation system query controller 204, the encoder dispatcher 206, the buffer 208, and/or, more generally, the example workflow manager 104 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example workflow manager 104 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
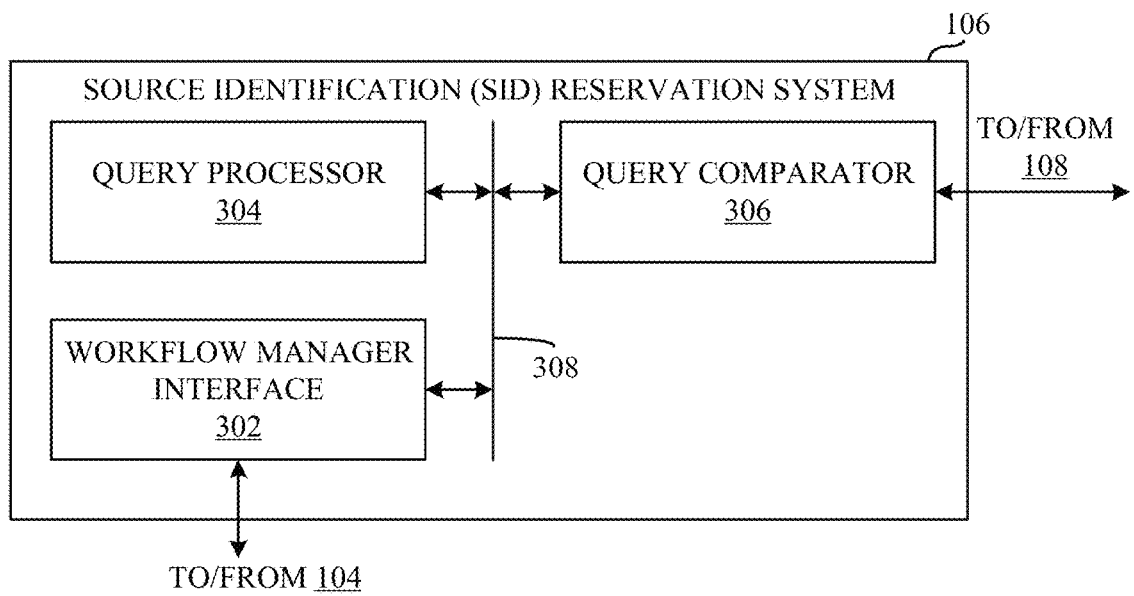
FIG. 3 is a block diagram showing additional detail of the example source identification (SID) reservation system (SRS) of FIG. 1.

FIG. 3 is a block diagram showing additional detail of the example source identification (SID) reservation system (SRS) 106 of FIG. 1. The example SRS 106 includes an example workflow manager interface 302, an example query processor 304, and an example query comparator 306. In the example of FIG. 3, any of the workflow manager interface 302, the query processor 304, and/or the query comparator 306 can communicate via an example communication bus 308. In examples disclosed herein, the communication bus 308 may be implemented using any suitable wired and/or wireless communication method.

In the illustrated example of FIG. 3, the SRS 106 processes queries from the workflow manager 104 to determine whether the duration of media at a first scheduled broadcast time associated with a candidate SID code overlaps with the duration of media at a second scheduled broadcast time associated with an SID code stored in the SID code and timing database 108. The workflow manager interface 302 is coupled to the workflow manager 104 and the communication bus 308. In the example of FIG. 3, the example workflow manager interface 302 can be implemented by one or more analog or digital circuit(s), logic circuits, programmable processor(s), programmable controller(s), GPU(s), DSP(s), ASIC(s), PLD(s) and/or FPLD(s). In some examples, the workflow manager interface 302 can be implemented by a workflow manager interface controller.

In the example of FIG. 3, the workflow manager interface 302 is configured to obtain queries from the workflow manager 104 and/or transmit one or more messages indicating whether a candidate SID code is available in the SID code and timing database 108 to the workflow manager 104. For example, in response to the SID code and timing database 108 not including the candidate SID code or the media associated with an SID code in the SID code and timing database 108 not overlapping the media associated with a query from the workflow manager 104, the workflow manager interface 302 can transmit a message to the workflow manager 104 indicating the SID code and the scheduled broadcast time of the media associated with the query. In response to the SID code and timing database 108 including the candidate SID code and the media associated with an SID code in the SID code and timing database 108 overlapping the media associated with a query from the workflow manager 104, the workflow manager interface 302 can transmit a message to the workflow manager 104 indicating that the SID code is not available.

In the illustrated example of FIG. 3, the query processor 304 processes queries from the workflow manager 104 to extract at least a scheduled broadcast time for media, a title (e.g., a label) for the media, and a duration of the media. The query processor 304 is coupled to the communication bus 308. In the example of FIG. 3, the example query processor 304 can be implemented by one or more analog or digital circuit(s), logic circuits, programmable processor(s), programmable controller(s), GPU(s), DSP(s), ASIC(s), PLD(s) and/or FPLD(s).

In the example of FIG. 3, the query processor 304 is configured to determine the candidate SID code, the scheduled broadcast time of the media associated with the query, the title of the media associated with the media, and the duration of the media based on the query received from the workflow manager interface 302. For example, the query processor 304 can parse the query and/or metadata associated with the query to determine the candidate SID code, the scheduled broadcast time of the media associated with the query, the title (e.g., the label) of the media associated with the media, and/or the duration of the media associated with the query.

In the illustrated example of FIG. 3, the query comparator 306 determines whether a candidate SID code is available in the SID code and timing database 108. The query comparator 306 is coupled to the SID code and timing database 108 and the communication bus 308. In the example of FIG. 3, the example query comparator 306 can be implemented by one or more analog or digital circuit(s), logic circuits, programmable processor(s), programmable controller(s), GPU(s), DSP(s), ASIC(s), PLD(s) and/or FPLD(s). In some examples, the query comparator 306 can be implemented by a query comparator controller.

In the example illustrated in FIG. 3, the query comparator 306 is configured to determine whether the SID code and timing database 108 includes a candidate SID code associated with a query. In some examples, the query comparator 306 can access a LUT with the candidate SID code to determine whether the candidate SID code is included in the SID code and timing database 108. In other examples, the query comparator 306 can search the SID code and timing database 108 via a search value (e.g., a search string) including the candidate SID code.

In the example of FIG. 3, in response to determining that the SID code and timing database 108 does not include the candidate SID code, the query comparator 306 can associate the SID code with the media title (e.g., the media label), the scheduled broadcast time, and the duration of the media associated with the query. After associating the SID code with the media title (e.g., the media label), the scheduled broadcast time, and the duration of the media associated with the query, the query comparator 306 can store the associated media title (e.g., media label), the scheduled broadcast time, and the duration of the media associated with the query in the SID code and timing database 108.

In the illustrated example of FIG. 3, in response to determining that the SID code and timing database 108 includes the candidate SID code, the query comparator 306 determines whether the duration at the scheduled broadcast time of the media associated with SID code stored in the SID code and timing database 108 overlaps with the duration at the scheduled broadcast time of the media associated with the candidate SID code of the query.

In the example of FIG. 3, in response to determining that the duration at the scheduled broadcast time of the media associated with SID code stored in the SID code and timing database 108 does not overlap with the duration at the scheduled broadcast time of the media associated with the candidate SID code of the query, the query comparator 306 can associate the SID code with the media title (e.g., the media label), the scheduled broadcast time, and the duration of the media associated with the query. After associating the SID code with the media title (e.g., the media label), the scheduled broadcast time, and the duration of the media associated with the query, the query comparator 306 can store the associated media title (e.g., media label), the scheduled broadcast time, and the duration of the media associated with the query in the SID code and timing database 108.

In the example of FIG. 3, in response to determining that the duration at the scheduled broadcast time of the media associated with SID code stored in the SID code and timing database 108 overlaps with the duration at the scheduled broadcast time of the media associated with the candidate SID code of the query, the query comparator 306 can indicate to the workflow manager interface 302 that the candidate SID code is not available.

In some examples, if the scheduled broadcast time of the media associated with SID code stored in the SID code and timing database 108 is within a threshold time period of the duration at the scheduled broadcast time of the media associated with the candidate SID code of the query, the query comparator 306 can indicate to the workflow manager interface 302 that the SID code is unavailable for the media associated with the query. For example, the threshold time period is 15 minutes, the scheduled broadcast time of a first television program associated with a first SID code stored in the SID code and timing database 108 is 6 PM Eastern Standard Time (EST) on Sep. 1, 2019, and the scheduled broadcast time for a second television program associated with the first SID code is 7 PM EST on Sep. 1, 2019, the second television program including a duration of 45 minutes, the query comparator 306 can indicate to the workflow manager interface 302 that the first SID code is unavailable for the second television program. Additionally or alternatively, the threshold time period can be predetermined and/or adjusted on the fly based on, for example, media programming density (e.g., more programs scheduled that are watermarked using the same SID code).

While an example manner of implementing the source identification reservation system 106 of FIG. 1 is illustrated in FIG. 3, one or more of the elements, processes and/or devices illustrated in FIG. 3 may be combined, divided, re-arranged, omitted, eliminated and/or implemented in any other way. Further, the example workflow manager interface 302, the example query processor 304, the example query comparator 306, and/or, more generally, the example source identification reservation system 106 of FIG. 3 may be implemented by hardware, software, firmware and/or any combination of hardware, software and/or firmware. Thus, for example, any of the example workflow manager interface 302, the example query processor 304, the example query comparator 306, and/or, more generally, the example source identification reservation system 106 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workflow manager interface 302, the example query processor 304, the example query comparator 306, and/or, more generally, the example source identification reservation system 106 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example source identification reservation system of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
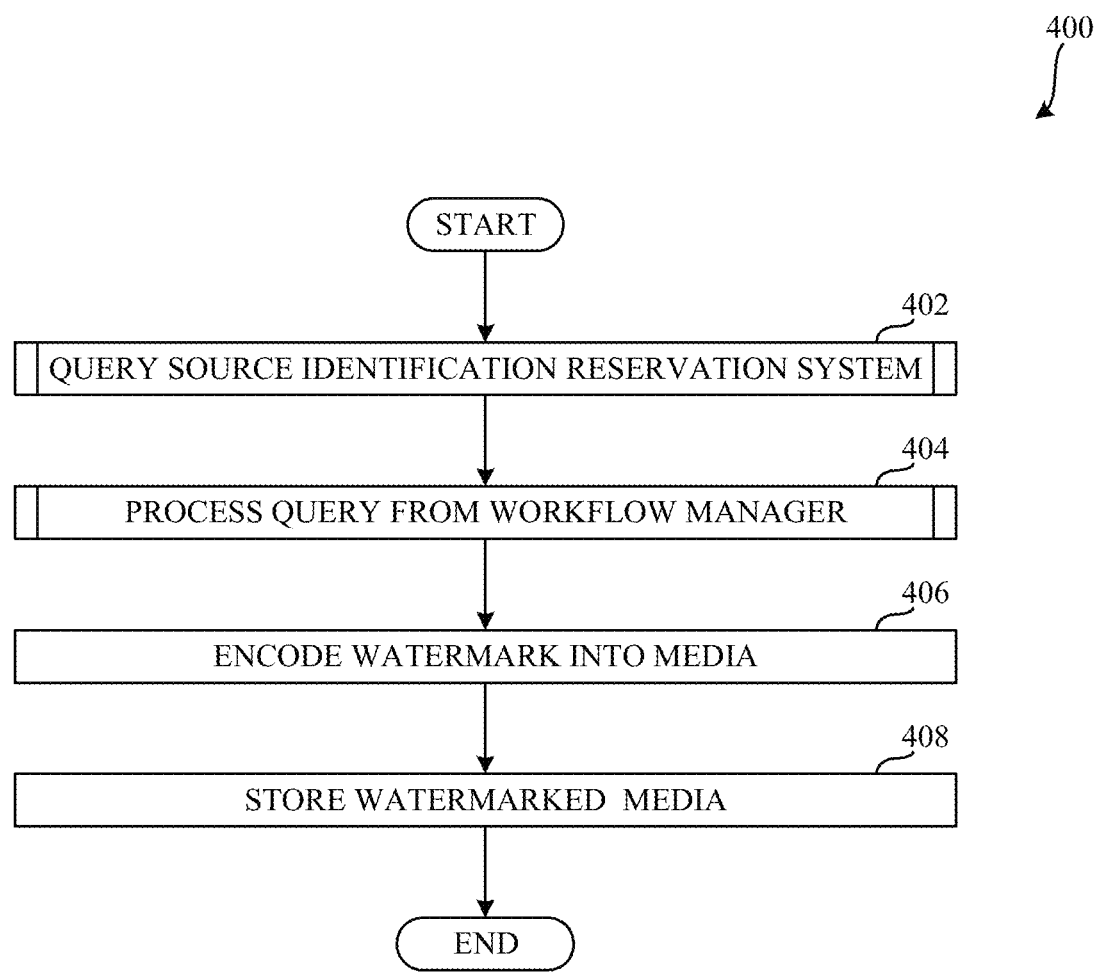
FIG. 4 is a flowchart representative of machine-readable instructions which may be executed to implement the workflow manager of FIGS. 1 and 2, the source identification reservation system of FIGS. 1 and 3, and/or the encoder of FIG. 1.

A flowchart representative of example hardware logic, machine readable instructions, hardware implemented state machines, and/or any combination thereof for implementing the workflow manager 104 of FIGS. 1 and 2, the source identification reservation system 106 of FIGS. 1 and 3, and/or the encoder 110 of FIG. 1 is shown in FIG. 4. The machine readable instructions may be one or more executable programs or portion(s) of an executable program for execution by a computer processor such as the processor 912 and/or the processor 1012 shown in the example processor platform 900 and/or the example processor platform 1000 discussed below in connection with FIGS. 9 and/or 10. The program may be embodied in software stored on a non-transitory computer readable storage medium such as a CD-ROM, a floppy disk, a hard drive, a DVD, a Blu-ray disk, or a memory associated with the processor 912 and/or the processor 1012, but the entire program and/or parts thereof could alternatively be executed by a device other than the processor 912 and/or the processor 1012 and/or embodied in firmware or dedicated hardware. Further, although the example program is described with reference to the flowchart illustrated in FIG. 4, many other methods of implementing the workflow manager 104, the source identification reservation system 106 and/or the encoder 110 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 5:
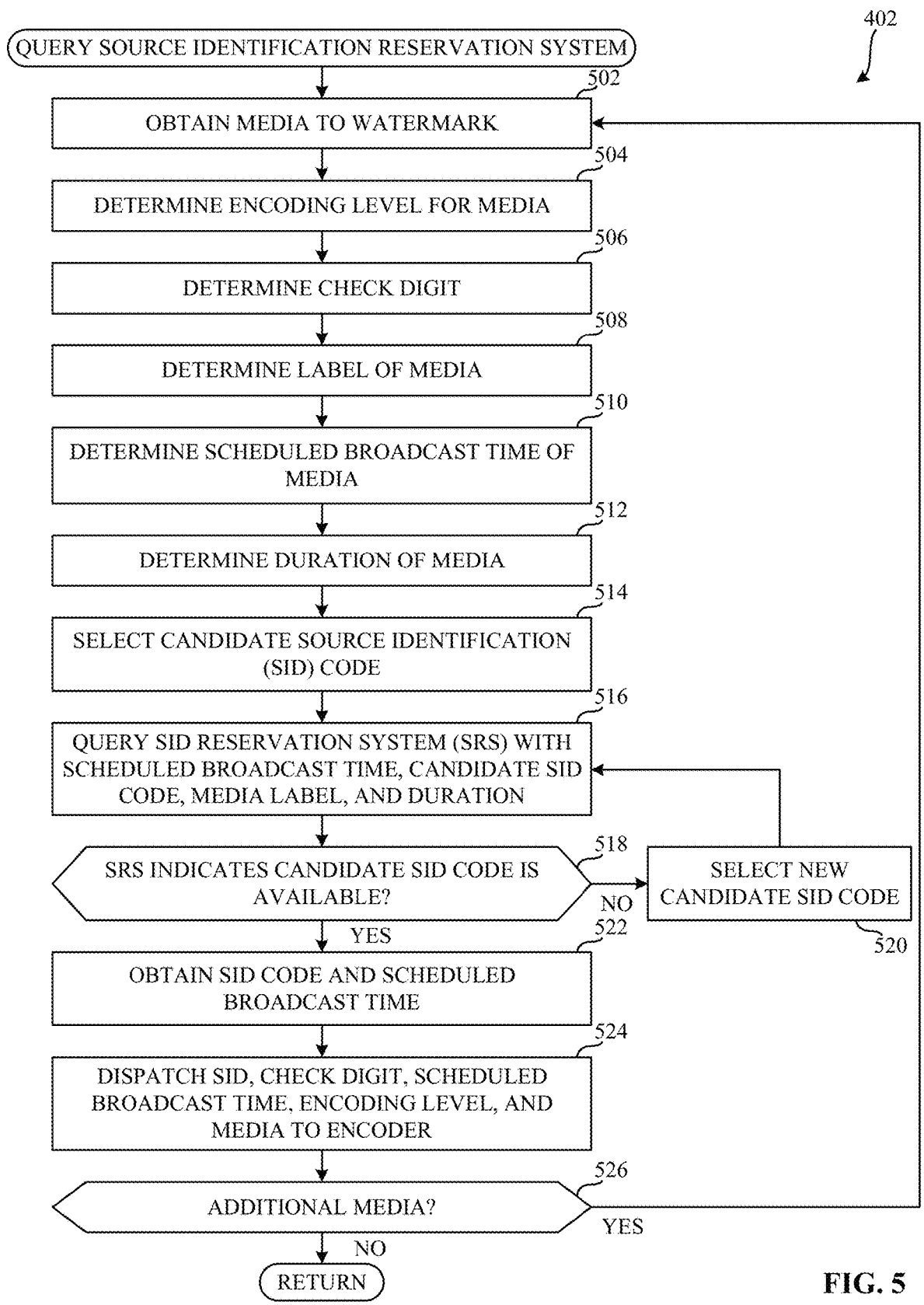
FIG. 5 is a flowchart representative of machine-readable instructions which may be executed to implement the example workflow manager of FIGS. 1 and 2.

A flowchart representative of example hardware logic, machine readable instructions, hardware implemented state machines, and/or any combination thereof for implementing the workflow manager 104 of FIG. 2 is shown in FIG. 5. The machine-readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 5, many other methods of implementing the example workflow manager 104 of FIGS. 1 and 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 6:
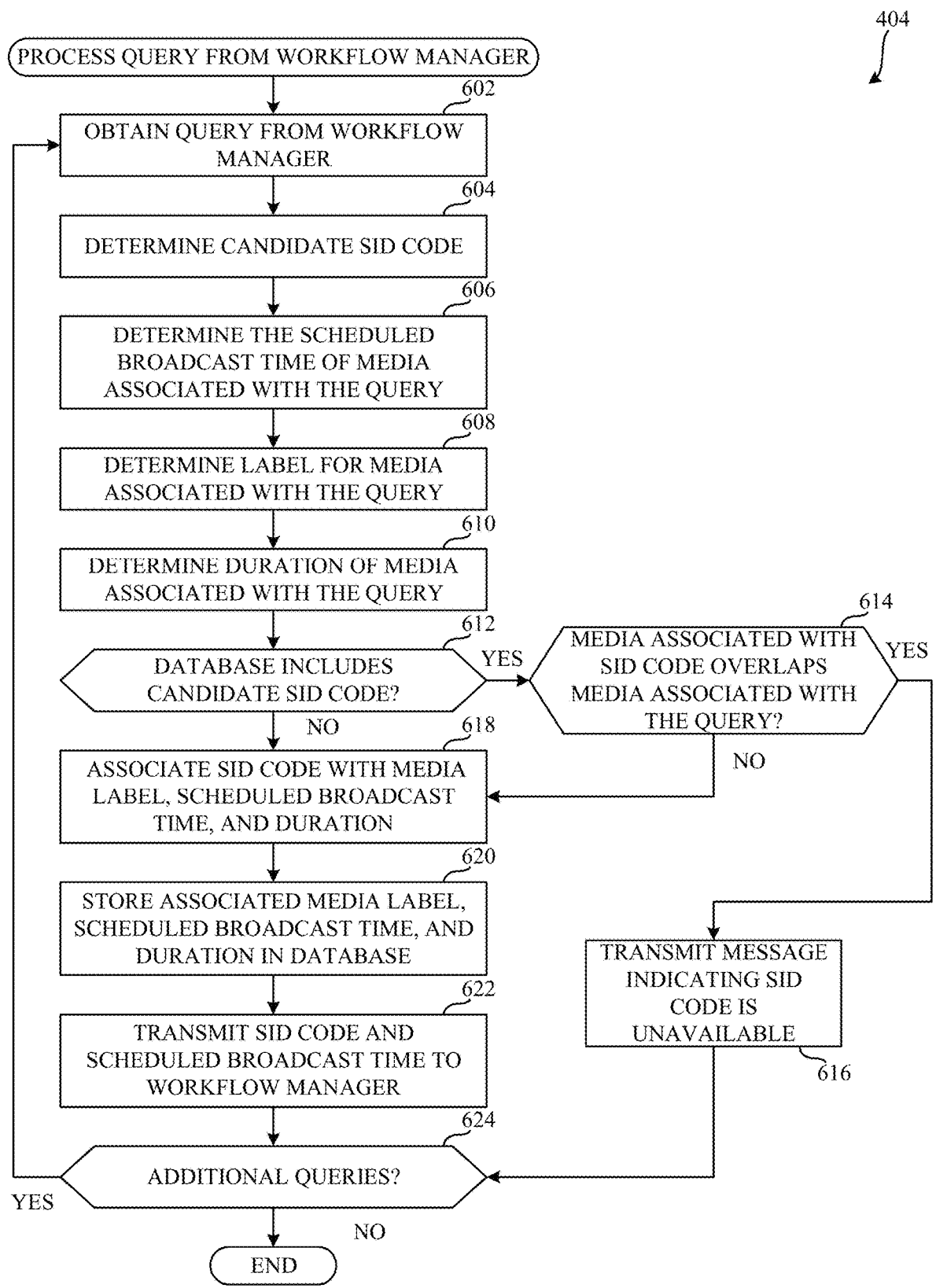
FIG. 6 is a flowchart representative of machine-readable instructions which may be executed to implement the example SID reservation system of FIGS. 1 and 3.

A flowchart representative of example hardware logic, machine readable instructions, hardware implemented state machines, and/or any combination thereof for implementing the source identification reservation system 106 of FIG. 3 is shown in FIG. 6. The machine-readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 6, many other methods of implementing the example source identification reservation system of FIGS. 1 and 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine-readable instructions 400 which may be executed to implement the workflow manager 104 of FIGS. 1 and 2, the source identification reservation system 106 of FIGS. 1 and 3, and/or the encoder 110 of FIG. 1. The machine-readable instructions 400 begin at block 402 where the workflow manager 104 queries the source identification (SID) reservation system (SRS) 106. Detailed example machine readable instructions to query the SRS 106 are illustrated and described in connection with FIG. 5.

In the example of FIG. 4, at block 404, the SRS 106 processes the query from the workflow manager 104. Detailed example machine readable instructions to process the query from the workflow manager 104 are illustrated and described in connection with FIG. 6. At block 406, the encoder 110 encodes a watermark into media based on the unique SID code determined by the workflow manager 104 and the SRS 106, the check digit generated by the workflow manager 104, the scheduled broadcast time of media, the encoding level to encode watermarks and/or codes into media. At block 408, the encoder 110 stores the watermarked media (e.g., the encoded media) in the encoded media database 112. In some examples, the encoder 110 transmits the watermarked media (e.g., the encoded media) to the broadcast controller 114. After block 408, the machine-readable instructions 400 terminate.

FIG. 5 is a flowchart representative of machine readable instructions 402 which may be executed to implement the example workflow manager 104 of FIGS. 1 and 2. The machine readable instructions 402 begin at block 502 where the media interface 202 obtains media to be watermarked from the media database 102. At block 504, the media interface 202 determines an encoding level to encode watermarks into the media obtained from the media database 102.

In the illustrated example of FIG. 5, at block 506, the media interface 202 determines a check digit to be utilized when watermarking the media ahead of time. At block 508, the media interface 202 determines the title (e.g., the label) of media obtained from the media database 102. At block 510, the media interface 202 determines a scheduled broadcast time for the media obtained from the media database 102. At block 512, the media interface 202 determines a duration of the media obtained from the media database 102.

In the illustrated example of FIG. 5, at block 514, the SRS query controller 204 selects a candidate SID code to apply to the media that is to be watermarked ahead of time. At block 516, the SRS query controller 204 transmits, to the SRS 106, a query including a scheduled broadcast time for the media to be watermarked, the candidate SID code to apply to the media to be watermarked, the title (e.g., the label) of the media to be watermarked, and the duration of the media to be watermarked (e.g., in seconds).

In the example of FIG. 5, at block 518, the SRS query controller 204 determines whether the SRS 106 indicates that the candidate SID code is available in the SID code and timing database 108. In response to determining that a response from the SRS 106 indicates the candidate SID code is not available in the SID code and timing database 108 (block 518: NO), the SRS query controller 204 can select a new candidate SID code at block 520. In response to determining that a response from the SRS 106 indicates the candidate SID is available in the SID code and timing database 108 (block 518: YES), the SRS query controller 204 obtains the SID code and scheduled broadcast time for the media to be watermarked ahead of time from the SRS 106 at block 522.

In the illustrated example of FIG. 5, at block 524, the encoder dispatcher 206 dispatches the SID code, the check digit, the scheduled broadcast time, the encoding level, and the associated media to be watermarked ahead of time to the encoder 110. At block 526, the media interface 202 determines whether there is additional media to watermark. If there is additional media to watermark (block 526: YES), the machine-readable instructions 402 proceed to block 502. If there is not additional media to watermark (block 526: NO), the machine-readable instructions 402 return to block 404 of the machine-readable instructions 400 of FIG. 4.

FIG. 6 is a flowchart representative of machine readable instructions 404 which may be executed to implement the example SID reservation system 106 of FIGS. 1 and 3. The machine readable instructions 404 begin at block 602 where the workflow manager interface 302 obtains queries from the workflow manager 104. At block 604, the query processor 304 determines the candidate SID code based on the query received from the workflow manager interface 302. At block 606, the query processor 304 determines the scheduled broadcast time of the media associated with the query based on the query received from the workflow manager interface 302. At block 608, the query processor 304 determines the title of the media associated with the media based on the query received from the workflow manager interface 302. At block 610, the query processor 304 determines the duration of the media based on the query received from the workflow manager interface 302.

In the illustrated example of FIG. 6, at block 612, the query comparator 306 determines whether the SID code and timing database 108 includes a candidate SID code associated with a query. In response to determining that the SID code and timing database 108 does not include the candidate SID code (block 612: NO), the machine-readable instructions 500 proceed to block 618. In response to determining that the SID code and timing database 108 includes the candidate SID code (block 612: YES), the machine-readable instructions 404 proceed to block 614.

In the example of FIG. 6, at block 614, the query comparator 306 determines whether the duration at the scheduled broadcast time of the media associated with SID code stored in the SID code and timing database 108 overlaps with the duration at the scheduled broadcast time of the media associated with the candidate SID code of the query. In response to determining that the duration at the scheduled broadcast time of the media associated with SID code stored in the SID code and timing database 108 does not overlap with the duration at the scheduled broadcast time of the media associated with the candidate SID code of the query (block 614: NO), the machine readable instructions 404 proceed to block 618. In response to determining that the duration at the scheduled broadcast time of the media associated with SID code stored in the SID code and timing database 108 overlaps with the duration at the scheduled broadcast time of the media associated with the candidate SID code of the query (block 614: YES), the machine readable instructions 404 proceed to block 616.

In the example of FIG. 6, at block 616, in response to the SID code and timing database 108 including the candidate SID code and the media associated with an SID code in the SID code and timing database 108 overlapping the media associated with a query from the workflow manager 104, the workflow manager interface 302 transmits a message to the workflow manager 104 indicating that the SID code is not available. After block 616, the machine-readable instructions 404 proceed to block 624.

In the illustrated example of FIG. 6, at block 618, the query comparator 306 associates the SID code with the media title (e.g., the media label), the scheduled broadcast time, and the duration of the media associated with the query. After associating the SID code with the media title (e.g., the media label), the scheduled broadcast time, and the duration of the media associated with the query, the query comparator 306, at block 620, stores the associated media title (e.g., media label), the scheduled broadcast time, and the duration of the media associated with the query in the SID code and timing database 108.

In the example of FIG. 6, at block 622, in response to the SID code and timing database 108 not including the candidate SID code or the media associated with an SID code in the SID code and timing database 108 not overlapping the media associated with a query from the workflow manager 104, the workflow manager interface 302 transmits a message to the workflow manager 104 indicating the SID code and the scheduled broadcast time of the media associated with the query. At block 624, the workflow manager interface 302 determines whether there are additional queries from the workflow manager 104. If there are additional queries to process (block 624: YES), the machine-readable instructions 500 proceed to block 602. If there are not additional queries to process (block 624: NO), the machine-readable instructions 404 return to block 406 of the machine-readable instructions 400 of FIG. 4.

FIG. 7 is a table 700 representative of example operations executed at the SID reservation system 106 of FIGS. 1 and 3. The operations of table 700 represent operations executed at the SRS 106 when processing queries from the workflow manager 104. The table 700 includes rows R1, R2, R3, R4, R5, R6, R7, R8 and columns C1, C2, C3, and C4. The rows of table 700 represent sequential queries that the SRS 106 processes such that row R1 represents a query at a first time and R8 represents a query at a second time later than the first time. Column C1 represents the SID code associated with the query, column C2 represents the scheduled broadcast time of the media associated with the query, column C3 represents the final timestamp to be applied to the watermarked media after encoding, and column C4 represents additional information associated with the query, such as, the media label and/or title, the duration of the media associated with the query, and if the candidate SID code associated with the query is available in the SID code and timing database 108.

In the example of FIG. 7, at an example first operation 702, the SRS 106 receives a query including a candidate SID code of 002, a scheduled broadcast time of 6 AM on Sep. 1, 2019, a label of 2nd program, and a duration of 90 minutes. The SRS 106 (e.g., the query comparator 306) determines that SID code 002 has not been previously stored in the SID code and timing database 108. In response to determining that the SID code 002 has not been previously stored in the SID code and timing database 108, the SRS 106 (e.g., the query comparator 306) associates the SID code 002 with the media label (e.g., 2nd program), the scheduled broadcast time (e.g., 6 AM on Sep. 1, 2019), and the duration (e.g., 90 minutes) and stores the information in the SID code and timing database 108. The SRS 106 (e.g., the workflow manager interface 302) subsequently transmits a message to the workflow manager 104 indicating the SID code and the scheduled broadcast time of the media associated with the query.

In the illustrated example of FIG. 7, at an example second operation 704, the SRS 106 receives a query including a candidate SID code of 001, a scheduled broadcast time of 6 AM on September 1, 219, a label of 4th program, and a duration of 60 minutes. The SRS 106 (e.g., the query comparator 306) determines that SID code 001 has been previously stored in the SID code and timing database 108 (e.g., R1) and determines whether the duration at the scheduled broadcast time of the media associated with SID code stored in the SID code and timing database 108 (e.g., SID code 001 at R1) overlaps with the duration at the scheduled broadcast time of the media associated with the candidate SID code of the query (e.g., SID code 001 at R4). In response to the media associated with an SID code in the SID code and timing database 108 overlapping the media associated with a query from the workflow manager 104, the SRS 106 (e.g., the workflow manager interface 302) transmits a message to the workflow manager 104 indicating that the SID code is not available for the duration of the media at the scheduled broadcast time of the media associated with the query.

FIG. 8 is a table 800 representative of example additional operations executed at the SID reservation system 106 of FIGS. 1 and 3. The operations of table 800 represent operations executed at the SRS 106 when processing queries from the workflow manager 104. The table 800 includes rows R1, R2, R3, R4, R5, R6, R7 and columns C1, C2, C3, and C4. The rows of table 800 represent sequential queries that the SRS 106 processes such that row R1 represents a query at a first time and R7 represents a query at a second time later than the first time. Column C1 represents the SID code associated with the query, column C2 represents the scheduled broadcast time of the media associated with the query, column C3 represents the final timestamp to be applied to the watermarked media after encoding, and column C4 represents additional information associated with the query, such as, the media label and/or title, the duration of the media associated with the query, and if the candidate SID code associated with the query is available in the SID code and timing database 108.

In the example of FIG. 8, at an example first operation 802, the SRS 106 receives a query including a candidate SID code of 001, a scheduled broadcast time of 2:30 AM on Sep. 1, 2019, a label of 3rd program, and a duration of 60 minutes. The SRS 106 (e.g., the query comparator 306) determines that SID code 001 has been previously stored in the SID code and timing database 108 (e.g., R1 and R2) and determines whether the duration at the scheduled broadcast time of media associated with SID code stored in the SID code and timing database 108 (e.g., SID code 001 at R1 and the SID code 001 at R2) overlaps with the duration at the scheduled broadcast time of the media associated with the candidate SID code of the query (e.g., SID code 001 at R3). In response to media associated with an SID code in the SID code and timing database 108 not overlapping the media associated with a query from the workflow manager 104, the SRS 106 (e.g., the workflow manager interface 302) transmits a message to the workflow manager 104 indicating the SID code and the scheduled broadcast time of the media associated with the query.

In the illustrated example of FIG. 8, at an example second operation 804, the SRS 106 receives a query including a candidate SID code of 002, a scheduled broadcast time of 12 AM on Sep. 1, 2019, a label of 4th program, and a duration of 60 minutes. The SRS 106 (e.g., the query comparator 306) determines that SID code 002 has not been previously stored in the SID code and timing database 108. In response to determining that the SID code 002 has not been previously stored in the SID code and timing database 108, the SRS 106 (e.g., the query comparator 306) associates the SID code 002 with the media label (e.g., 4th program), the scheduled broadcast time (e.g., 12 AM on Sep. 1, 2019), and the duration (e.g., 60 minutes) and stores the information in the SID code and timing database 108. The SRS 106 (e.g., the workflow manager interface 302) subsequently transmits a message to the workflow manager 104 indicating the SID code and the scheduled broadcast time of the media associated with the query.

Figure 9:
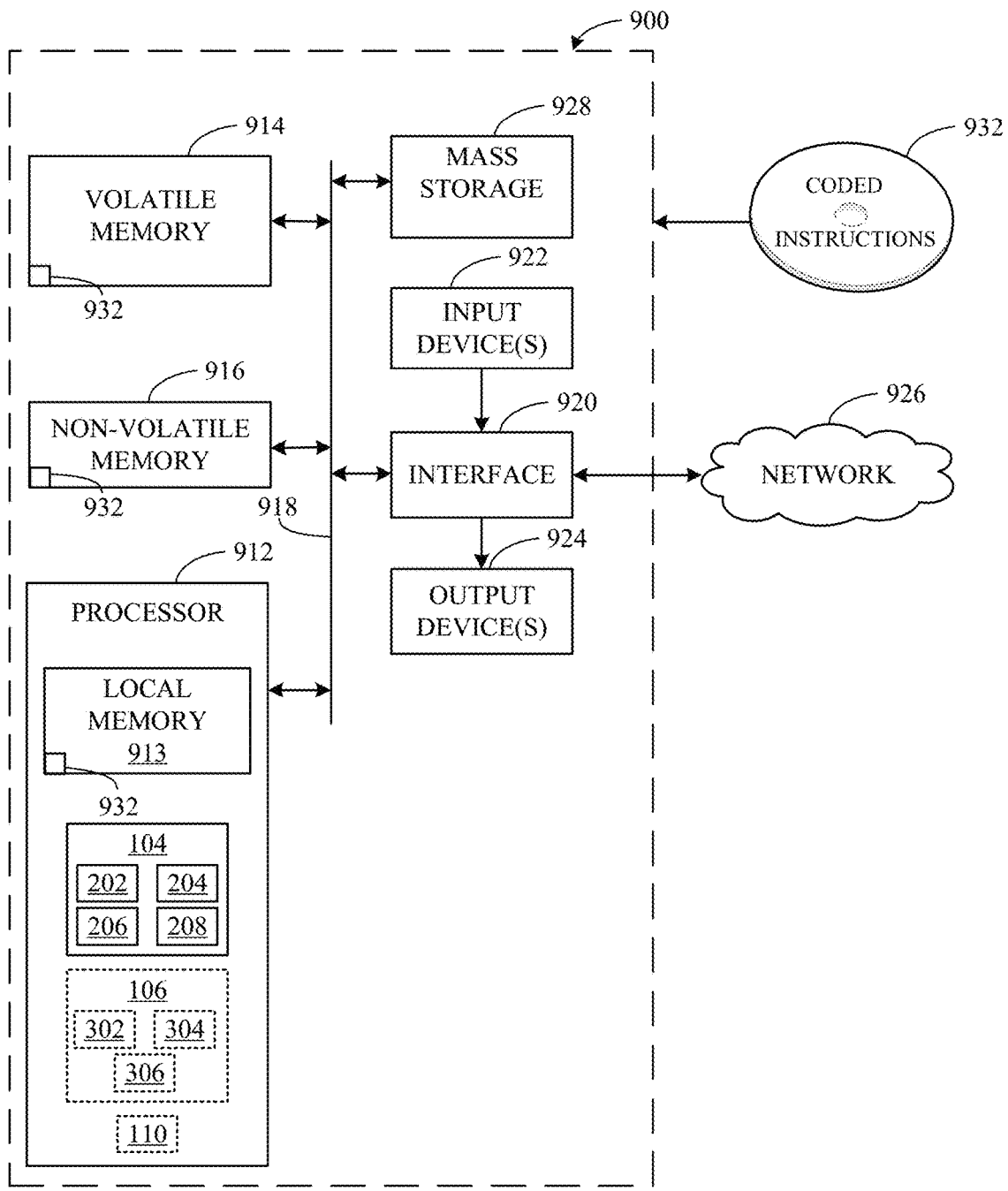
FIG. 9 is a block diagram of an example processing platform structured to execute the instructions of FIG. 4 and/or FIG. 5 to implement the example workflow manager of FIGS. 1 and 2, the SID reservation system 106 of FIGS. 1 and 3, and/or the encoder 110 of FIG. 1.

FIG. 9 is a block diagram of an example processor platform 900 structured to execute the instructions of FIG. 4 and/or FIG. 5 to implement the workflow manager 104 of FIGS. 1 and 2, the SID reservation system 106 of FIGS. 1 and 3, and/or the encoder 110 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example media interface 202, the example source identification reservation system query controller 204, the example encoder dispatcher 206, the example buffer 208, and/or, more generally, the example workflow manager 104. Additionally or alternatively, the processor 912 can implement the example workflow manager interface 302, the example query processor 304, the example query comparator 306, and/or, more generally, the example source identification reservation system 106, and/or the example encoder 110.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 4 and/or 5 may be stored in the mass storage device 928, in the volatile memory 914, in the non-volatile memory 916, and/or on a removable non-transitory computer readable storage medium such as a CD or DVD.

Figure 10:
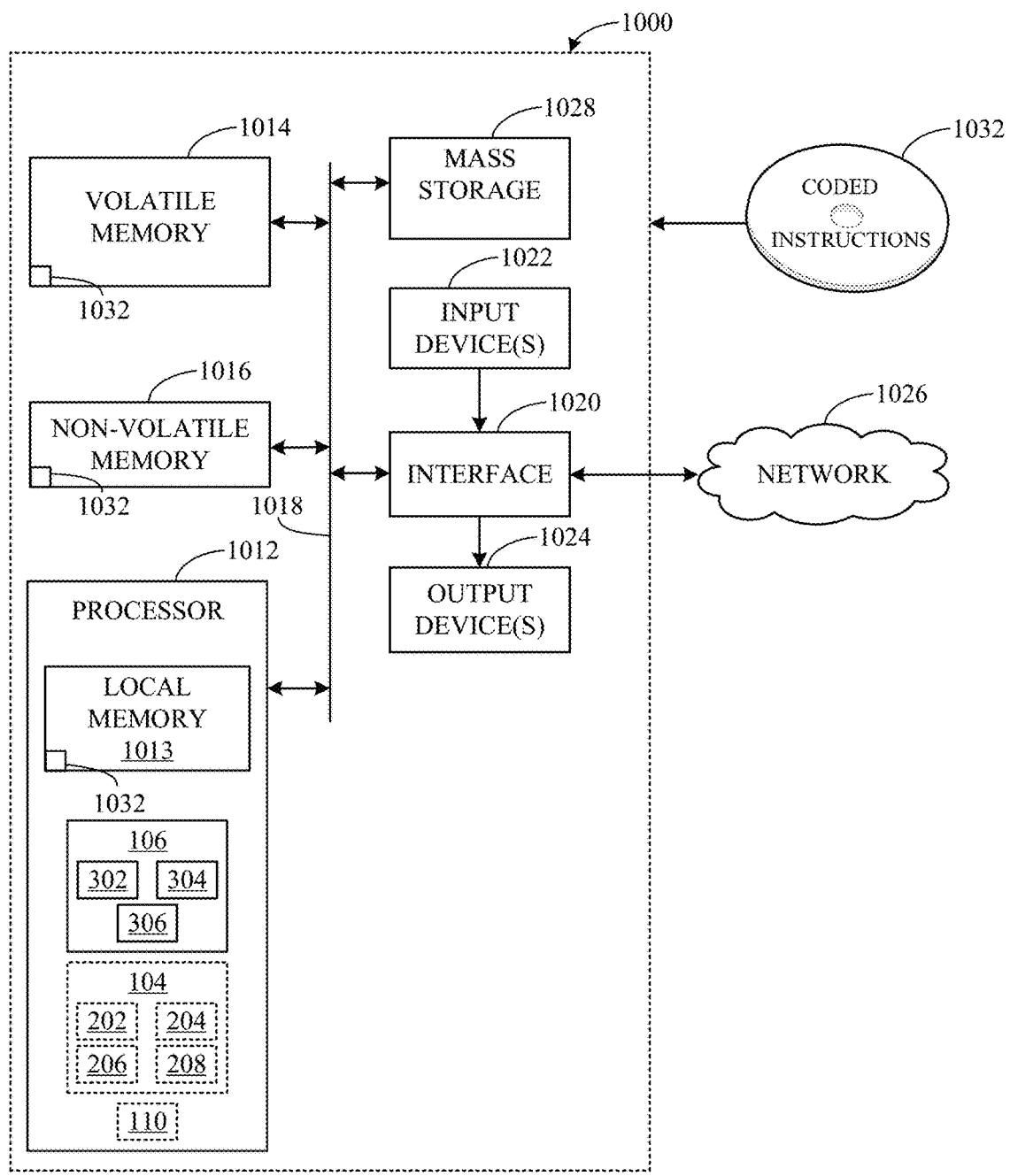
FIG. 10 is a block diagram of an example processing platform structured to execute the instructions of FIG. 4 and/or FIG. 6 to implement the example SID reservation system of FIGS. 1 and 3, the workflow manager 104 of FIGS. 1 and 2, and/or the encoder 110 of FIG. 1.

FIG. 10 is a block diagram of an example processor platform 1000 structured to execute the instructions of FIG. 4 and/or FIG. 6 to implement the SID reservation system 106 of FIGS. 1 and 3, the workflow manager 104 of FIGS. 1 and 2, and/or the encoder 110 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the example workflow manager interface 302, the example query processor 304, the example query comparator 306, and/or, more generally, the example SID reservation system 106. Additionally or alternatively, the processor 1012 can implement the example media interface 202, the example source identification reservation system query controller 204, the example encoder dispatcher 206, the example buffer 208, and/or, more generally, the example workflow manager 104, and/or the example encoder 110.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 4 and/or 6 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that reduce the time of encoding watermarks into media. For example, when utilizing previous encoding techniques, media with six audio channels could be watermarked in an hour, however, when utilizing examples disclosed herein, media that includes six audio channels can be watermarked in ten minutes. Thus, examples disclosed herein provide encoding techniques that are five times faster than previous encoding techniques. Furthermore, examples disclosed herein improve the scalability and flexibility of encoding watermarks in media. The disclosed methods, apparatus and articles of manufacture improve the efficiency of using a computing device by reducing the hardware overhead for implementing multiple watermark encoders. Examples disclosed herein reduce the operational costs associated with encoding watermarks as well as the physical space used to encode watermarks into media.

Additionally, examples disclosed herein reduce the power consumption associated with encoding watermarks into media. Furthermore, because examples disclosed herein reduce the hardware overhead for implementing watermarks encoders, examples disclosed herein additionally reduce the failure points in encoding watermarks. Thus, examples disclosed herein reduce the number of repairs to hardware associated with watermark encoding. The disclosed methods, apparatus and articles of manufacture are accordingly directed to one or more improvement(s) in the functioning of a computer.

Example methods, apparatus, systems, and articles of manufacture to identify media for ahead of time watermark encoding are disclosed herein. Further examples and combinations thereof include the following:

Example 1 includes an apparatus comprising a processor to determine a first identifier associated with first media based on a query received from a workflow manager, the query including the first identifier, a first scheduled broadcast time of the first media, and a first duration of the first media, and a comparator to in response to determining a database includes a second identifier associated with second media, determine whether a second duration of the second media at a second scheduled broadcast time overlaps the first duration of the first media at the first scheduled broadcast time, and in response to determining that the second duration of the second media at the second scheduled broadcast time does not overlap the first duration of the first media at the first scheduled broadcast time, store the first identifier in the database.

Example 2 includes the apparatus of example 1, further including a workflow manager interface to, in response to the second duration of the second media at the second scheduled broadcast time overlapping the first duration of the first media at the first scheduled broadcast time, transmit a message to the workflow manager indicating that the first identifier is not available.

Example 3 includes the apparatus of example 1, wherein the query includes the first identifier, the first scheduled broadcast time of the first media, the first duration of the first media, and a label of the first media.

Example 4 includes the apparatus of example 3, wherein the comparator is to associate the first identifier with the label of the first media, the first scheduled broadcast time, and the first duration of the first media included in the query.

Example 5 includes the apparatus of example 3, further including a query processor to determine the first identifier, the first scheduled broadcast time, the label of the first media, and the first duration based on the query.

Example 6 includes the apparatus of example 1, wherein the comparator is to determine whether the database includes the first identifier.

Example 7 includes the apparatus of example 6, further including a workflow manager interface to, in response to the database not including the first identifier, transmit a message to the workflow manager indicating the first identifier and the first scheduled broadcast time of the first media.

Example 8 includes a non-transitory computer readable storage medium comprising instruction which, when executed, cause at least one processor to at least determine a first identifier associated with first media based on a query received from a workflow manager, the query including the first identifier, a first scheduled broadcast time of the first media, and a first duration of the first media, in response to determining a database includes a second identifier associated with second media, determine whether a second duration of the second media at a second scheduled broadcast time overlaps the first duration of the first media at the first scheduled broadcast time, and in response to determining that the second duration of the second media at the second scheduled broadcast time does not overlap the first duration of the first media at the first scheduled broadcast time, store the first identifier in the database.

Example 9 includes the computer readable storage medium of example 8, wherein the instructions, when executed, cause the at least one processor to, in response to the second duration of the second media at the second scheduled broadcast time overlapping the first duration of the first media at the first scheduled broadcast time, transmit a message to the workflow manager indicating that the first identifier is not available.

Example 10 includes the computer readable storage medium of example 8, wherein the query includes the first identifier, the first scheduled broadcast time of the first media, the first duration of the first media, and a label of the first media.

Example 11 includes the computer readable storage medium of example 10, wherein the instructions, when executed, cause the at least one processor to associate the first identifier with the label of the first media, the first scheduled broadcast time, and the first duration of the first media included in the query.

Example 12 includes the computer readable storage medium of example 10, wherein the instructions, when executed, cause the at least one processor to determine the first identifier, the first scheduled broadcast time, the label of the first media, and the first duration based on the query.

Example 13 includes the computer readable storage medium of example 8, wherein the instructions, when executed, cause the at least one processor to determine whether the database includes the first identifier.

Example 14 includes the computer readable storage medium of example 13, wherein the instructions, when executed, cause the at least one processor to, in response to the database not including the first identifier, transmit a message to the workflow manager indicating the first identifier and the first scheduled broadcast time of the first media.

Example 15 includes a method comprising determining a first identifier associated with first media based on a query received from a workflow manager, the query including the first identifier, a first scheduled broadcast time of the first media, and a first duration of the first media, in response to determining a database includes a second identifier associated with second media, determining whether a second duration of the second media at a second scheduled broadcast time overlaps the first duration of the first media at the first scheduled broadcast time, and in response to determining that the second duration of the second media at the second scheduled broadcast time does not overlap the first duration of the first media at the first scheduled broadcast time, storing the first identifier in the database.

Example 16 includes the method of example 15, further including in response to the second duration of the second media at the second scheduled broadcast time overlapping the first duration of the first media at the first scheduled broadcast time, transmitting a message to the workflow manager indicating that the first identifier is not available.

Example 17 includes the method of example 15, wherein the query includes the first identifier, the first scheduled broadcast time of the first media, the first duration of the first media, and a label of the first media.

Example 18 includes the method of example 17, further including associating the first identifier with the label of the first media, the first scheduled broadcast time, and the first duration of the first media included in the query.

Example 19 includes the method of example 17, further including determining the first identifier, the first scheduled broadcast time, the label of the first media, and the first duration based on the query.

Example 20 includes the method of example 15, further including determining whether the database includes the first identifier. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A computing system configured to perform a set of operations, the set of operations comprising:
   determining a broadcast time of a media asset;
   determining an identifier for the media asset;
   determining that a combination of the identifier and the broadcast time is unique by referencing a database storing broadcast times for media assets having respective identifiers; and
   based on the determining that the combination of the identifier and the broadcast time is unique, causing a watermark to be encoded in the media asset using the identifier and prior to the media asset being broadcast.

2. The computing system of claim 1, wherein determining that the combination of the identifier and the broadcast time is unique comprises determining that the broadcast time does not overlap with another broadcast time for another media asset having the same identifier.

3. The computing system of claim 2, wherein:
   the broadcast time comprises a start time and a duration, and
   the determining that the combination of the identifier and the broadcast time is unique comprises determining that the broadcast time of the media asset does not overlap with the broadcast time of the other media asset based on the start time and the duration.

4. The computing system of claim 1, wherein the media asset is a video-on-demand media asset.

5. The computing system of claim 1, wherein the identifier is a source identification code.

6. The computing system of claim 1, wherein the database is implemented as a search engine.

7. The computing system of claim 1, wherein the set of operations further comprises storing the watermarked media asset.

8. A method comprising:
   determining, by a computing system, a broadcast time of a media asset;
   determining, by the computing system, an identifier for the media asset;
   determining, by the computing system, that a combination of the identifier and the broadcast time is unique by referencing a database storing broadcast times for media assets having respective identifiers; and
   based on the determining that the combination of the identifier and the broadcast time is unique, causing a watermark to be encoded in the media asset using the identifier and prior to the media asset being broadcast.

9. The method of claim 8, wherein determining that the combination of the identifier and the broadcast time is unique comprises determining that the broadcast time does not overlap with another broadcast time for another media asset having the same identifier.

10. The method of claim 9, wherein:
    the broadcast time comprises a start time and a duration, and
    the determining that the combination of the identifier and the broadcast time is unique comprises determining that the broadcast time of the media asset does not overlap with the broadcast time of the other media asset based on the start time and the duration.

11. The method of claim 8, wherein the media asset is a video-on-demand media asset.

12. The method of claim 8, wherein the identifier is a source identification code.

13. The method of claim 8, wherein the database is implemented as a search engine.

14. The method of claim 8, further comprising storing the watermarked media asset.

15. A non-transitory computer-readable medium having stored therein instructions that, when executed by a computing system, cause the computing system to perform a set of operations comprising:
   determining a broadcast time of a media asset;
   determining an identifier for the media asset;
   determining that a combination of the identifier and the broadcast time is unique by referencing a database storing broadcast times for media assets having respective identifiers; and
   based on the determining that the combination of the identifier and the broadcast time is unique, causing a watermark to be encoded in the media asset using the identifier and prior to the media asset being broadcast.

16. The non-transitory computer-readable medium of claim 15, wherein determining that the combination of the identifier and the broadcast time is unique comprises determining that the broadcast time does not overlap with another broadcast time for another media asset having the same identifier.

17. The non-transitory computer-readable medium of claim 16, wherein:
   the broadcast time comprises a start time and a duration, and
   the determining that the combination of the identifier and the broadcast time is unique comprises determining that the broadcast time of the media asset does not overlap with the broadcast time of the other media asset based on the start time and the duration.

18. The non-transitory computer-readable medium of claim 15, wherein the media asset is a video-on-demand media asset.

19. The non-transitory computer-readable medium of claim 15, wherein the identifier is a source identification code.

20. The non-transitory computer-readable medium of claim 15, wherein the database is implemented as a search engine.

* * * * *